US007392202B1

(12) United States Patent
O'Brien

(10) Patent No.: US 7,392,202 B1
(45) Date of Patent: Jun. 24, 2008

(54) METHODS AND SYSTEMS FOR PROVIDING AN INSURANCE POLICY WITH AN INFLATION PROTECTION OPTION

(75) Inventor: Dennis O'Brien, Austin, TX (US)

(73) Assignee: New York Life Insurance Company, New York, NY (US)

( * ) Notice: Subject to any disclaimer, the term of this patent is extended or adjusted under 35 U.S.C. 154(b) by 401 days.

(21) Appl. No.: 10/191,737

(22) Filed: Jul. 8, 2002

(51) Int. Cl.
*G06Q 10/00* (2006.01)
(52) U.S. Cl. .................................... 705/4; 705/2; 705/3
(58) Field of Classification Search ............... 705/2–4
See application file for complete search history.

(56) References Cited

U.S. PATENT DOCUMENTS

| 6,014,632 A | 1/2000 | Gamble et al. ............... 705/4 |
| 2003/0004844 A1* | 1/2003 | Hueler ....................... 705/35 |
| 2003/0144888 A1* | 7/2003 | Baron et al. ................. 705/4 |

FOREIGN PATENT DOCUMENTS

| WO | WO 01/50306 | 7/2001 |
| WO | WO 01/69504 | 9/2001 |
| WO | WO 02/15457 | 2/2002 |

OTHER PUBLICATIONS

Anonymous, "A Shopper's Guide to Long-Term Care Insurance", National Association of Insurance Commissioners, 1999, 45 pages.*

Iglehart, Mark, "Don't gamble when planning for long-term care", The National Public Accountant, Apr. 2001, vol. 46, No. 2, pp. 11.*

Anonymous, "Long-Term Care: Benefits", TIAA-CREF, May 20, 2002, 2 pages.*

De Simone, Marcella, "Early enrollment period begins for Federal LTCI Program", Ntional Underwriter, Apr. 1, 2002, vol. 106, No. 13, pp. 40.*

"Financing long-term care: Employee needs and attitudes, and the employer's role," by Lee Madamba Granza et al, International Society of Certified Employee Benefits Specials 1998 Benefits Quarterly, vol. 14, No. 4, pp. 60-72.*

"Market Mix" Anonymous, National Underwriter, vol. 103, No. 40, p. 33-36, Published on Oct. 4, 1999, ISSN: 0893-8202; Dialog ID No. 01909576.*

(Continued)

*Primary Examiner*—Joseph Thomas
*Assistant Examiner*—Vivek Koppikar
(74) *Attorney, Agent, or Firm*—Dreier LLP; Seth H. Ostrow

(57) ABSTRACT

This invention provides methods and systems for providing an insurance policy having an inflation protection option that is computed at least partially based on information useful in offering a long term care insurance policy to an individual and at least partially based on the option for the individual to purchase additional coverage at a subsequent premium that is computed based at least partially on the individual's age at a date, which date is other than the date the option to purchase the additional coverage is offered, such as the date the policy issued.

24 Claims, 3 Drawing Sheets

OTHER PUBLICATIONS www.state.nd.us/ndins/consumer/details.asp (The North Dakota Department of Insurance Website)—This website provides an additional definition of "Issue Age" (p. 2, Last Paragraph).*

"Southern launches policies," Financial Services Week, p. 27 (Jun. 24, 1991); Author: Not given. Dialog ID No. 01735002. From Dialog File 16:Gale Group Prompt®.*

Kim Purnell, "*Avoiding Fraud When Buying Long-Term Care*" (visited May 20, 2002) <http://consumerlawpage.com/article/insure.shtml>.

TIAA-CREF, "*Long-Term Care: Benefits*", (visited May 20, 2002) <http://www.tiaa-cref.org/ltc/ltcbenefits/ltcbenes4.html>.

* cited by examiner

METHODS AND SYSTEMS FOR PROVIDING AN INSURANCE POLICY WITH AN INFLATION PROTECTION OPTION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates generally to methods and systems for providing an insurance policy with inflation protection. More particularly, the methods and systems of the present invention provide an insurance policy such as for long term care (LTC) with an inflation protection option that allows individuals, e.g., the insured, to purchase additional coverage to offset the effect of inflation on insurance policy limitations.

Insurance policies typically include coverage limitations such as maximum coverage for a given period of time or for a given event. LTC policies, for instance, which insure against the costs associated with care or supervision needed to assist an insured with activities of daily living that may result from long term illnesses or disabilities, normally include maximum coverage limitations such as maximum payable daily benefits and maximum aggregate claims payable for any given time period or event. A problem associated with policies such as LTC policies that include maximum coverage limitations is that maximum coverage limitations are determined or specified at the time the policy is purchased. However, inflation may out-pace the maximum coverage limitations thereby leaving the insured in an increasingly underinsured position over time.

The insurance industry, at least with respect to LTC policies, has adopted two approaches to address the effect of inflation on maximum coverage limitations: a level premium funded percentage increase ("Level Premium") approach and a guaranteed additional amounts of insurance at attained age rates ("Guaranteed Additional Amounts") approach.

With respect to the Level Premium approach to inflation, maximum coverage limitations are automatically increased annually at a fixed rate throughout the duration of the policy. The rate at which the maximum coverage limitations are increased is usually specified by the insurer and typically ranges between 1% and 5%, the most common rate of increase being 5%. The rate of increases may be applied as a simple rate increase or as a compounded rate increase. A simple rate increase entails adding to the maximum coverage limitations a percentage of the original maximum coverage, where the percentage corresponds to the specified rate of increase. Compounded rate increases increase the maximum coverage at the specified rate of increase compounded annually. The additional coverage under the Level Premium approach is funded with a fixed additional premium above a premium for a similar policy without inflation protection.

This approach, however, has several shortcomings. In periods of high inflation, for instance, the specified rate of increase may be outpaced by inflation thereby leaving the insured in an underinsured position. In periods of lower inflation, where the rate of inflation is less than the specified rate of increase, the insured will essentially be forced into being overinsured. Additionally, Level Premium policies lock an insured into paying the fixed additional premium for the duration of the policy without the flexibility of being able to opt out from an increase and thereby out from the additional premium for any year. Moreover, the fixed additional premium for the duration of the policy is disproportionately inflated early in the term of the policy as compared to the risk to the insurer in order to compensate for an increasing risk as the insured ages. This is disadvantageous to an insured that, for example, terminates coverage prior to the completion of the term of the policy.

With respect to the Guaranteed Additional Amounts approach to inflation, an insured is granted a right to receive an option to purchase additional coverage that is offered at specific intervals in the duration of the policy. Maximum coverage is typically increased at a rate of increase that is either fixed, e.g., 1%, 2%, etc., or based on the consumer price index (CPI), and the increases may be applied either as simple rate increases or as compounded rate increases. Inflation protection under the Guaranteed Additional Amounts approach, however, normally includes several limitations on the continued right to purchase additional maximum coverage. An insured, for instance, may lose the right to receive the option to purchase increases in the coverage limitations after declining a certain number of offers. The additional coverage under this approach is funded by an additional premium that is computed based on the insured's attained age at the time the offer to purchase additional coverage is made.

The Guaranteed Additional Amounts approach has other shortcomings as well. Since the additional premium is computed based on the insured's attained age and since the risk associated with long term care increases as the insured ages, the additional premium for the additional coverage becomes increasingly more expensive for each successive offer. This drawback is especially unfavorable to an insured that may be on a fixed income or otherwise cannot afford higher premiums beyond a certain monetary limit. Such an insured, therefore, may lose inflation protection altogether because he is not able to pay for additional coverage and may decline a certain number of offers.

A need therefore exists for methods for providing inflation protection for insurance, such as LTC insurance, that is effective, cost sensitive, and otherwise solves the problems associated with the existing methods just described.

This need is also not addressed by existing tools for analyzing and administering LTC policies. For example, U.S. Pat. No. 6,014,632, entitled "Apparatus and Method for Determining Insurance Benefit Amounts Based on Groupings of Long-Term Care Patients with Common Characteristics," hereby incorporated herein by reference discusses systems for providing LTC insurance coverage with variable maximum benefit limitations that are based on the severity of the health conditions that require long term care. International PCT Application WO 02/15457, entitled "Computer Program and Method for Determining the Economic Impact of Long-Term Care," hereby incorporated herein by reference, provides for a computer program that assists the user in analyzing the insured and uninsured impact of a hypothetical fact scenario on an individual's personal assets. International PCT Application WO 01/50306, entitled "Decision Support System and Methodology With Multi-Dimensional Analysis," hereby incorporated herein by reference, provides systems that allow users to determine the actual and expected results for long term care insurance based on data provided to the system. International PCT Application WO 01/69504, entitled "System and Method for Long Term Care Insurance Administration," hereby incorporated herein by reference, provides a computer based insurance administration system specific to LTC polices for use in processing applications, administering claims, automated billing, etc. The systems and methods discussed in these documents, however, do not address inflation protection and the problems associated therewith.

SUMMARY OF THE INVENTION

It is therefore an object of this invention, among other things, to provide methods and systems that provide an insurance policy with an inflation protection option without some or all of the drawbacks and shortcomings discussed above. Particularly, methods and systems for providing a long term care (LTC) policy with an inflation protection option that allows an insured to purchase additional coverage at a subsequent premium that is at least partially based on the insured's age that is other than the insured's attained age at the time the offer to purchase the additional coverage is made.

This may be achieved by offering an insurance policy, such as an LTC policy, with an inflation protection option at a first or original insurance premium computed at least partially based on information useful in assessing a risk to insure the individual and at least partially based on an option that allows the individual to purchase additional coverage at a subsequent or additional premium, the subsequent premium is computed based at least partially on the individual's age at a predetermined date, which age is other than the individual's age at a date the option to purchase the additional coverage is offered, such as the insured's age at the date the policy issued. The information may be obtained by a variety of individuals, such as by insurance agents, representatives of the insurance company, human resources employees of a company, etc. Useful information may include personal attributes, policy limitations, and a rate or rates of increase. The option to purchase additional coverage may be offered periodically, such as annually. The additional coverage includes increases in maximum coverage limitations, such as an increased maximum daily benefit, an increased maximum aggregate claims payable, etc. The first insurance premium may also be based on the lack of any restrictions on the available inflation protection option that may effect the individuals ability to purchase additional coverage, at least while the policy is in effect.

This may also be achieved by providing inflation protection for an insurance policy, such as an LTC policy, which involves issuing an insurance policy at a first insurance premium to cover an individual at a subsequent insurance premium computed based at least partially on the individual's age at a predetermined date that is preferably not the individual's age at a date the option to purchase additional coverage is offered, such as the individual's age at the date the policy issued. Offers to purchase additional coverage may be made at periodic intervals, such as annually, and the additional coverage may be proportional to a selected rate of increase.

Although the insurance policy discussed herein will generally be a LTC policy, those skilled in the art will understand that the present invention may be applied to a variety of insurance policies that have coverage limitations that are adversely affected by inflation.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
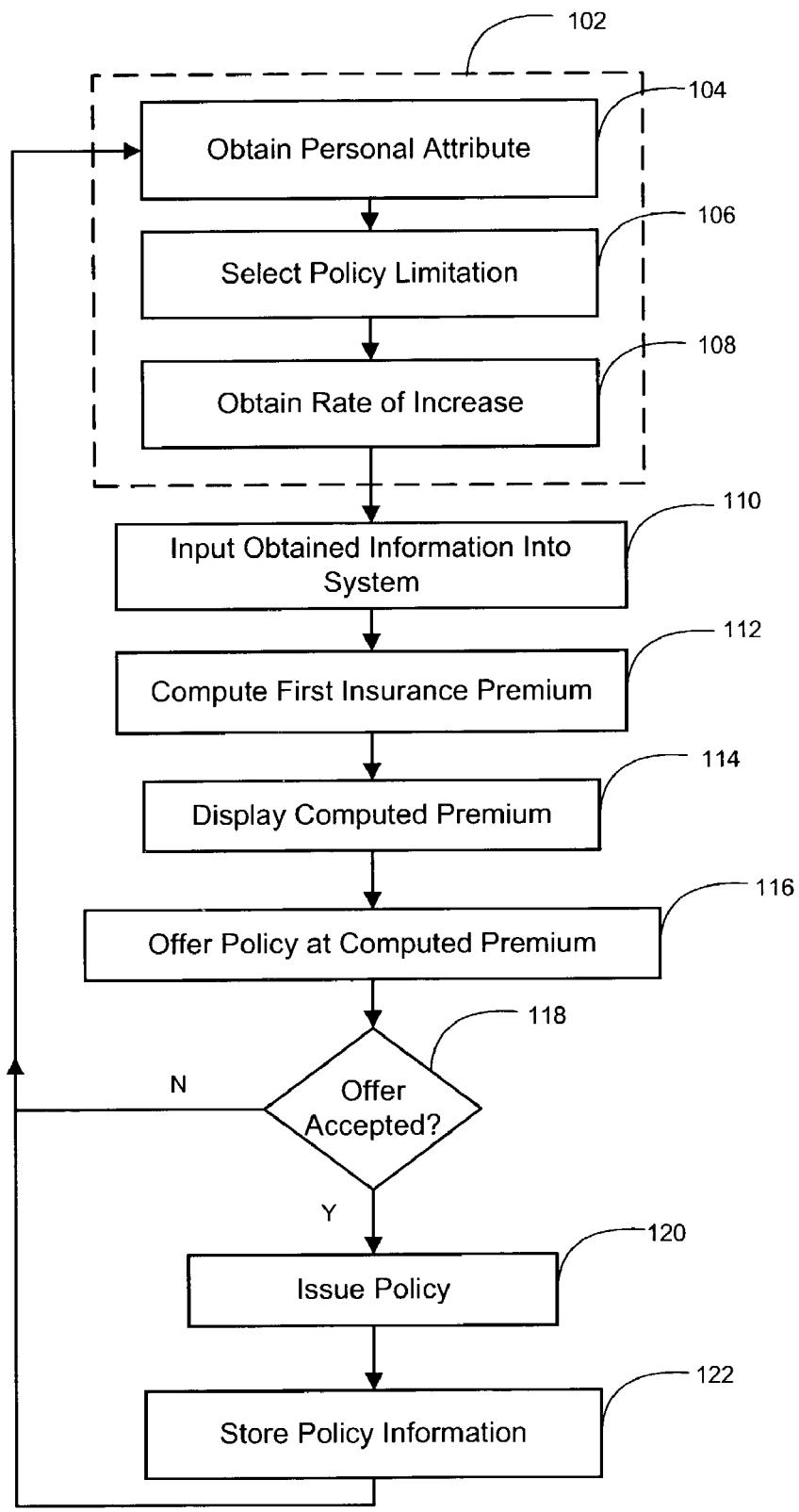
FIG. 1 is a flowchart of a method of providing an insurance policy with inflation protection according to a preferred embodiment of this invention.

Referring to FIG. 1, a method of providing an insurance policy, such as a long term care (LTC) insurance policy, with inflation protection, according to a preferred embodiment, begins with obtaining information useful in providing LTC insurance to an individual, step #102. This includes obtaining at least one attribute personal to the individual, step #104, which includes characteristics that distinguish or otherwise describe the individual, such as the individual's name, age, gender, a risk-based classification or classifications, etc. Some personal information such as age and gender are used in computing LTC premiums and are usually required. A risk-based classification may include, for example, whether or not the individual is overweight, has a chronic health condition such as high blood pressure, or has a history of adverse medical events such as a stroke.

Obtaining information useful in providing LTC insurance to an individual, step #102, in one embodiment, includes obtaining information regarding policy limitations, step #106. Policy limitations are generally terms of an insurance policy that limit the scope of coverage, which for LTC policies include limitations with respect to the maximum daily benefits, maximum aggregate claims, a deductible, a benefit period, an elimination period, etc. In one embodiment, the individual is able to elect to include or exclude particular limitations, and is able to, for some or all of the limitations, specify the amount or select from a group of amounts applicable to particular limitations. For example, the individual is able to specify a particular maximum amount for the maximum daily benefits or for the maximum aggregate claims, or select from a group of maximum amounts therefor. The individual is also able to specify or select a particular deductible that will be applied before the insured's claims are paid. A deductible is generally a threshold amount that the insured is responsible for above which threshold amount the insurer is responsible. The deductible can be specified in such terms as a daily amount, a per claim amount, etc. Similarly, individuals are able to elect, and/or specify or select an applicable benefit period and/or elimination period from a group thereof. A benefit period is a time period, e.g., 30 days, 60 days, 6 months, 1 year, 5 years, etc., in which covered expenses incurred therein will be the responsibility of the insurer. An elimination period, much like a deductible, is a threshold period of time in which expenses incurred are the responsibility of the insured. In another embodiment, all of the policy limitations are specified or dictated by the insurer.

Obtaining information useful in providing LTC insurance to an individual, step #102, in one embodiment, also includes selecting a rate of increase for an inflation protection option, step #108. The inflation protection option grants a right to the insured to receive periodic offers to purchase an additional coverage amount at a subsequent premium in order for the insured to offset the effect of inflation on coverage limitations. The periodic offers are made available at a first date at predetermined intervals of time, such as annually, biannually, etc., or at non-fixed intervals, such as at least once a year, once every two years, etc. In one embodiment, the offers to purchase additional coverage are made annually measured from the day the policy issues. The predetermined time interval may be specified by the insurer or otherwise selected by the individual. The subsequent insurance premium is computed at least partially based on the insured's age at predetermined date, such as the age at the date the policy issues or some other specified date. However, the predetermined date is other than the first date which the option to purchase additional coverage for which the subsequent premium being computed is made available.

The additional coverage amount is applied to increase the amount of at least one of the maximum coverage limitations, such as maximum daily benefits, maximum aggregate claims, etc. In one embodiment, the amount of the additional coverage is specified or selected by the individual at the time the policy is purchased. Alternatively the amount of the additional coverage is specified or dictated by insurer. The additional coverage amount is specified as being proportional to a given or selectable rate of increase or percentage, e.g., 1%, 2%, etc. Alternatively, the additional coverage amount is specified as being proportional to a rate of increase that corresponds to a relevant index useful in determining a particular rate of inflation. In one embodiment, the relevant index is the consumer price index (CPI), which can indicate or gauge inflation in general. Alternatively, the relevant index is one that is linked to a particular industry, such as an index that tracks the rate of inflation in a medical services industry. The rate of increase proportional to a relevant index is specified as the index or the index plus or minus a given or selectable percentage. For example, selected rates of increase linked to the CPI include: the CPI rate, the CPI rate+1%, the CPI rate−1%, the CPI rate+2, the CPI rate−2%, etc. The additional coverage amount, e.g., the rate of increase, is applied at a compounded rate. Alternatively, the additional coverage is applied at a simple rate.

The information useful in providing LTC insurance to an individual obtained at step #102 is input into a computer system, step #110, such as the computer systems described below. A first insurance premium to insure the individual is then computed, step #112. Computing generally denotes determining an amount or a number, which includes determining, with the use of a computer system, the first insurance premium using formulas, tables and charts, statistical data, etc. Alternatively, the first insurance premium is computed at least in part with the use of a computer where the computer system is used to generate, for example, tables, charts, graphs, etc., that are used to determine first insurance premium. The first insurance premium is computed as a fixed premium that is set to remain constant for the duration of the policy. It is anticipated that an insurer may reserve the right to increase the otherwise fixed premium, thus in such instances the first premium is computed as a fixed premium with expectation that it will remain constant for the duration of the policy. Alternatively, the first insurance premium is computed as a variable premium that either increases or decreases such that the first insurance premium may be back or front loaded, respectively. In an alternative embodiment, a plurality of first insurance premiums are computed, one for each of a set of predetermined rates of increase, thereby allowing the individual to view and select a policy based on or otherwise taking into account the computed first insurance premiums.

Computing the first insurance premium includes taking into account a variety of factors relevant to LTC insurance. In one embodiment, the first insurance premium is computed or otherwise determined at least partially based on at least one obtained or selected item of information useful in providing LTC insurance, such as a personal attribute, a policy limitation, or a rate of increase, and at least partially based on the policy including an inflation protection option such as the one described herein. In one embodiment, the item of information useful in providing LTC insurance includes at least one personal attribute, such as the individual's age, gender, a risk-based classification, etc. In yet another embodiment, the first insurance premium is computed at least partially based on the lack of any restrictions on the inflation protection option that may cancel or otherwise void the right to receive and or ability to accept subsequent offers to purchase an additional coverage amount while the policy is in effect.

In one embodiment, the first premium is computed with the following formula:

$$P = \frac{\sum_{t=1}^{t=\omega-x} [P_t + (N_t)(1+C_t)(1+R)^{(t-1)}](L_t)(V_t)}{\sum_{t=1}^{t=\omega-x} (1-M-E_t)(1+R)^{(t-1)}(L_t)(V_t)}$$

where
P=the first insurance premium, annually
t=the year of duration of the policy
ω=contract terminal age
x=the individual's age at the date the policy issues
$P_t$=per policy expenses for year t
$N_t$=claims incurred for year t
$C_t$=percent of claims equal to expenses for year t
R=assumed average rate of increase
$L_t$=expected contract years exposed for year t
$V_t$=discount factor for duration of policy from beginning of year t back to the issue date
M=margin percent
$E_t$=percent of premium expenses for year t.

The variable t is the particular year of the policy's duration, e.g., year 1, 2, 3, etc. The variable x is obtained from an individual and the contract terminal age, ω, is a maximum age the individual can reach based on assumed mortality tables for lifetime coverage. For example, based on mortality tables for an individual that is 62 years old, it can be assumed that the individual can reach a maximum age of 110 years old. The remainder of the variables are generally based on statistical data derived or estimated, and stored in a computer system. For instance the per policy expenses at year t, $P_t$, claims incurred at year t (which may or may not account for inflation), $N_t$, and percent of claims expenses at year t, $C_t$, expected contract years exposed for year t, $L_t$, discount factor for duration of policy from beginning of year t back to the issue date, $V_t$, and percent of premium expenses at year t, $E_t$, may be estimated based on statistical data gathered while administering the particular type of policy or similar policies, or otherwise estimated based on reasonable assumptions. The assumed average rate of increase, R, is specified or set by the insurer based on its judgment as to an appropriate rate associated with the offered index (such as the CPI) and the margin, M, is based on the business judgment of the insurer. For example, the variables used to compute the first insurance premium for an individual having an age 62 at the date the policy issues and a contract terminal age determined to be 110, and the policy having a 90-day elimination period, a 5-year benefit period and maximum daily benefits of $120 and $90 for facility care and home care, respectively; and the rate of increase applied at a compounded rate, according to the formula provided above appear in Table A.

TABLE A

| t | Lt | Pt | Nt | Vt | Et | Ct |
|---|---|---|---|---|---|---|
| 1 | 0.9988 | 34 | 80.54 | 1.00 | 137.39% | 4% |
| 2 | 0.9411 | 35 | 102.60 | 0.94 | 8.00% | 4% |
| 3 | 0.9044 | 36 | 127.11 | 0.88 | 10.31% | 4% |
| 4 | 0.8768 | 37 | 155.19 | 0.82 | 10.31% | 4% |
| 5 | 0.8572 | 38 | 188.32 | 0.77 | 10.31% | 4% |
| 6 | 0.8384 | 39 | 228.24 | 0.72 | 8.00% | 4% |
| 7 | 0.8178 | 40 | 275.45 | 0.68 | 8.00% | 4% |
| 8 | 0.7954 | 42 | 355.63 | 0.63 | 8.00% | 4% |
| 9 | 0.7714 | 43 | 456.46 | 0.59 | 8.00% | 4% |
| 10 | 0.7466 | 44 | 554.51 | 0.56 | 6.00% | 4% |
| 11 | 0.7209 | 46 | 641.34 | 0.52 | 6.00% | 4% |
| 12 | 0.6943 | 47 | 732.21 | 0.49 | 6.00% | 4% |
| 13 | 0.6666 | 48 | 843.93 | 0.46 | 6.00% | 4% |
| 14 | 0.6379 | 50 | 975.26 | 0.43 | 6.00% | 4% |
| 15 | 0.6082 | 51 | 1142.72 | 0.40 | 6.00% | 4% |
| 16 | 0.5774 | 53 | 1333.30 | 0.38 | 6.00% | 4% |
| 17 | 0.5458 | 54 | 1491.74 | 0.35 | 6.00% | 4% |
| 18 | 0.5134 | 56 | 1709.79 | 0.33 | 6.00% | 4% |
| 19 | 0.4804 | 58 | 1978.13 | 0.31 | 6.00% | 4% |
| 20 | 0.4470 | 59 | 2287.46 | 0.29 | 6.00% | 4% |
| 21 | 0.4134 | 61 | 2628.44 | 0.27 | 6.00% | 4% |
| 22 | 0.3800 | 63 | 2988.03 | 0.25 | 6.00% | 4% |
| 23 | 0.3470 | 65 | 3363.15 | 0.24 | 6.00% | 4% |
| 24 | 0.3146 | 67 | 3743.86 | 0.22 | 6.00% | 4% |
| 25 | 0.2832 | 69 | 4120.23 | 0.21 | 6.00% | 4% |
| 26 | 0.2528 | 71 | 4482.30 | 0.20 | 6.00% | 4% |
| 27 | 0.2236 | 73 | 4997.35 | 0.18 | 6.00% | 4% |
| 28 | 0.1958 | 75 | 5360.08 | 0.17 | 6.00% | 4% |
| 29 | 0.1696 | 78 | 5590.11 | 0.16 | 6.00% | 4% |
| 30 | 0.1450 | 80 | 5707.01 | 0.15 | 6.00% | 4% |
| 31 | 0.1224 | 82 | 5730.38 | 0.14 | 6.00% | 4% |
| 32 | 0.1016 | 85 | 5533.45 | 0.13 | 6.00% | 4% |
| 33 | 0.0830 | 87 | 5379.74 | 0.12 | 6.00% | 4% |
| 34 | 0.0664 | 90 | 5264.46 | 0.12 | 6.00% | 4% |
| 35 | 0.0520 | 93 | 5182.80 | 0.11 | 6.00% | 4% |
| 36 | 0.0397 | 95 | 5129.96 | 0.10 | 6.00% | 4% |
| 37 | 0.0295 | 98 | 5129.96 | 0.10 | 6.00% | 4% |
| 38 | 0.0213 | 101 | 5129.96 | 0.09 | 6.00% | 4% |
| 39 | 0.0148 | 104 | 5129.96 | 0.08 | 6.00% | 4% |
| 40 | 0.0099 | 107 | 5129.96 | 0.08 | 6.00% | 4% |
| 41 | 0.0063 | 111 | 5129.96 | 0.07 | 6.00% | 4% |
| 42 | 0.0038 | 114 | 5129.96 | 0.07 | 6.00% | 4% |
| 43 | 0.0022 | 117 | 5129.96 | 0.06 | 6.00% | 4% |
| 44 | 0.0011 | 121 | 5129.96 | 0.06 | 6.00% | 4% |
| 45 | 0.0005 | 124 | 5129.96 | 0.06 | 6.00% | 4% |
| 46 | 0.0002 | 128 | 5129.96 | 0.05 | 6.00% | 4% |
| 47 | 0.0001 | 132 | 5129.96 | 0.05 | 6.00% | 4% |
| 48 | 0.0000 | 136 | 5129.96 | 0.05 | 6.00% | 4% |
| 49 | 0.0000 | 140 | 5129.96 | 0.04 | 6.00% | 4% |

Assuming a margin M=17.840% and an assumed average rate of inflation R=3.00%, the yearly premium P=$1556. The variables and assumptions may be stored, such as in a variable database, and accessed by a computer system for the purpose of computing a first insurance premium or premiums.

In an alternative embodiment, the first insurance premium is computed by adjusting a premium for an insurance policy without an inflation protection option to account for the policy with the inflation protection option. This is accomplished by first computing a first insurance premium for a variety of variables, such as personal attributes, policy limits, rates of increase, etc., comparing the first premiums to premiums for a policy without the inflation protection option contemplating the same or similar variables, and storing on a computer system at least one adjustment factor based on the ratio of the premiums compared. The adjustment factors are then used by a computer system that is capable of computing a premium for a policy without the inflation protection option to compute a first insurance premium. Alternatively, the computer system will be used to generate tables, charts, graphs, etc. of adjustment factors for use in manually computing a first insurance premium. If for the example discussed above a premium for a policy without an inflation protection option is $1089 and it has been determined through statistical analysis or otherwise determined that an appropriate adjustment factor is 30% over the base premium, the first insurance premium to cover the additional risk associated with the particular inflation protection option is therefore $1089+30%=$1556.

The first insurance premium or premiums is/are displayed or otherwise presented to the user, step #114. The premium may be displayed on a display device associated with a computer system and/or in a printed version. The display and/or the printed version include the information input into the system that formed at least in part the basis for the computed first insurance premiums and at least one computed first insurance premium. The displayed information can then be provided to the individual in the form of an offer to purchase an insurance policy having the inflation protection option at the computed first insurance premium, step #116.

If at step #118 the individual does not accept the offer to purchase the insurance policy the inputted information is either saved on the computer system for future reference or deleted, and the steps in the methods described above can be repeated for the next individual. If instead the individual to whom the offer was made accepts the offer, the insurance policy will issue at the computed first insurance premium, step #120. The steps required to issue a policy vary depending on the types of users for the inventions described herein. For example, where the user is the insurer or a party authorized to act on behalf of the insurer, the policy will issue automatically or at some predetermined time thereafter, e.g., 30 days, etc. If however the user is an insurance agent with limited authority to bind the insurer, the policy will issue only after first being reviewed and accepted by the insurer. Similarly, conditions can be imposed by the insurer, such as a physical, etc., that must be satisfied before the policy issues. In any event, if the policy issues, policy information, such as the terms and conditions, the information obtained from the individual, and any other relevant information, such as contact information, etc., are stored in an appropriate database, step #122, such as an insured database.

Figure 2:
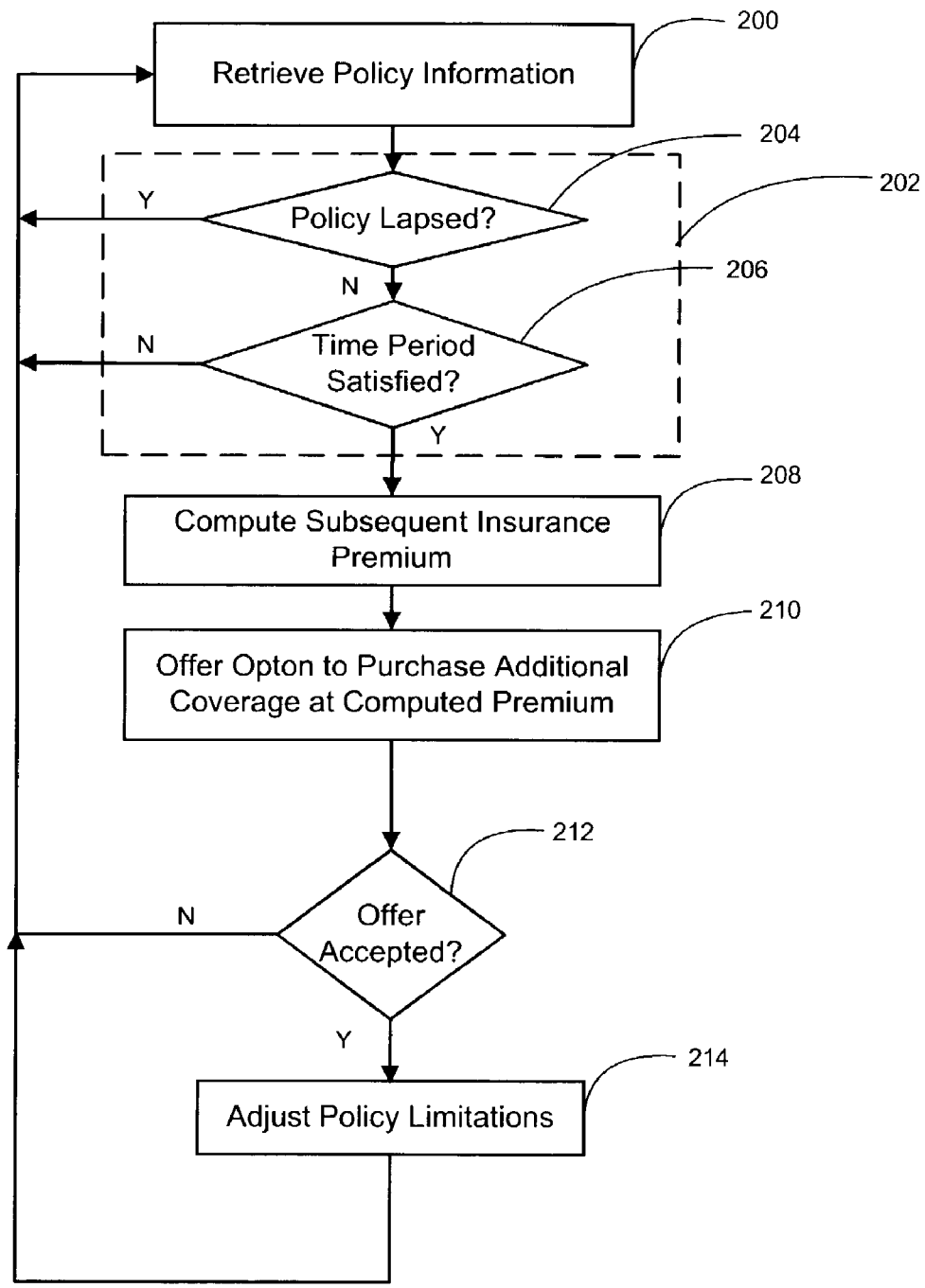
FIG. 2 is a flowchart of a method of providing inflation protection for an insurance policy according to a preferred embodiment of this invention.

Referring to FIG. 2, a method of providing inflation protection for an insurance policy after the policy issues, according to a preferred embodiment, begins with retrieving policy information, step #200, and testing the policy information #202. Testing generally denotes determining whether or not to offer an option to purchase an additional coverage amount. In one embodiment, testing includes determining whether or not the policy is in effect or has otherwise lapsed, step #204. In another embodiment, testing includes determining whether or not a predetermined time period, measured from either the issue date of the policy or from the previous offer, has been satisfied in order for a periodic offer to purchase additional coverage to be made, step #206. The predetermined time period is measured such that the offer can be made annually, biannually, etc., or at non-fixed intervals, such as at least once a year, once every two years, etc.

If at step #206 the predetermined time period is satisfied a subsequent insurance premium is then computed, step #208. A subsequent insurance premium, as discussed above, is computed at least partially based on the insured's age at a predetermined date, such as the age at the date the policy issues or some other specified date. However, the insured's age at the predetermined date is other than the insured's age at a first date, which is the date the offer to purchase additional coverage for which the subsequent premium being computed is made available. In one embodiment, the subsequent premium is computed at least partially based on the selected rate of increase. It is reasonably understood to those skilled in the art that the subsequent insurance premium may be computed based on statistical data gathered while administering particular policies or similar policies, or otherwise estimated based on reasonable assumptions.

After computing the subsequent premium, the option to purchase an additional coverage amount at the subsequent insurance premium is offered, step #210. The additional coverage amount is proportional to one or more given or selected rates of increase, such as a 1%, 2%, etc., or proportional to a relevant index, such as the CPI, the CPI+1, CPI−1%, CPI+2, CPI−2%, etc. If at step #212, the insured accepts the offer to purchase additional coverage, the additional coverage will be applied to the maximum coverage limitations, step #214. Applying additional coverage includes increasing the maximum coverage limitations, such as the maximum daily benefits and/or the maximum aggregate claims, in a manner proportional to the given or selected rate of increase and applied as either a simple rate increase or as a compounded rate increase.

For example, assuming maximum daily benefits of $120 and $90 for facility care and home care, respectively, and a rate of increase of 3% are either specified or selected, Table A illustrates the increases applied to the maximum daily benefits for each option accepted computed both as simple rate increases and as compounded rate increases.

TABLE A

| Option Accepted | Simple $120 | Simple $90 | Compounded $120 | Compounded $90 |
|---|---|---|---|---|
| 1 | 123.60 | 92.70 | 123.60 | 92.70 |
| 2 | 127.20 | 95.40 | 127.31 | 95.48 |
| 3 | 130.80 | 98.10 | 131.13 | 98.35 |
| 4 | 134.40 | 100.80 | 135.06 | 101.30 |
| 5 | 138.00 | 103.50 | 139.11 | 104.33 |
| 6 | 141.60 | 106.20 | 143.29 | 107.46 |
| 7 | 145.20 | 108.90 | 147.58 | 110.69 |
| 8 | 148.80 | 111.60 | 152.01 | 114.01 |
| 9 | 152.40 | 114.30 | 156.57 | 117.43 |
| 10 | 156.00 | 117.00 | 161.27 | 120.95 |
| 11 | 159.60 | 119.70 | 166.11 | 124.58 |
| 12 | 163.20 | 122.40 | 171.09 | 128.32 |
| 13 | 166.80 | 125.10 | 176.22 | 132.17 |
| 14 | 170.40 | 127.80 | 181.51 | 136.13 |
| 15 | 174.00 | 130.50 | 186.96 | 140.22 |
| 16 | 177.60 | 133.20 | 192.56 | 144.42 |
| 17 | 181.20 | 135.90 | 198.34 | 148.76 |
| 18 | 184.80 | 138.60 | 204.29 | 153.22 |
| 19 | 188.40 | 141.30 | 210.42 | 157.82 |
| 20 | 192.00 | 144.00 | 216.73 | 162.55 |

Figure 3:
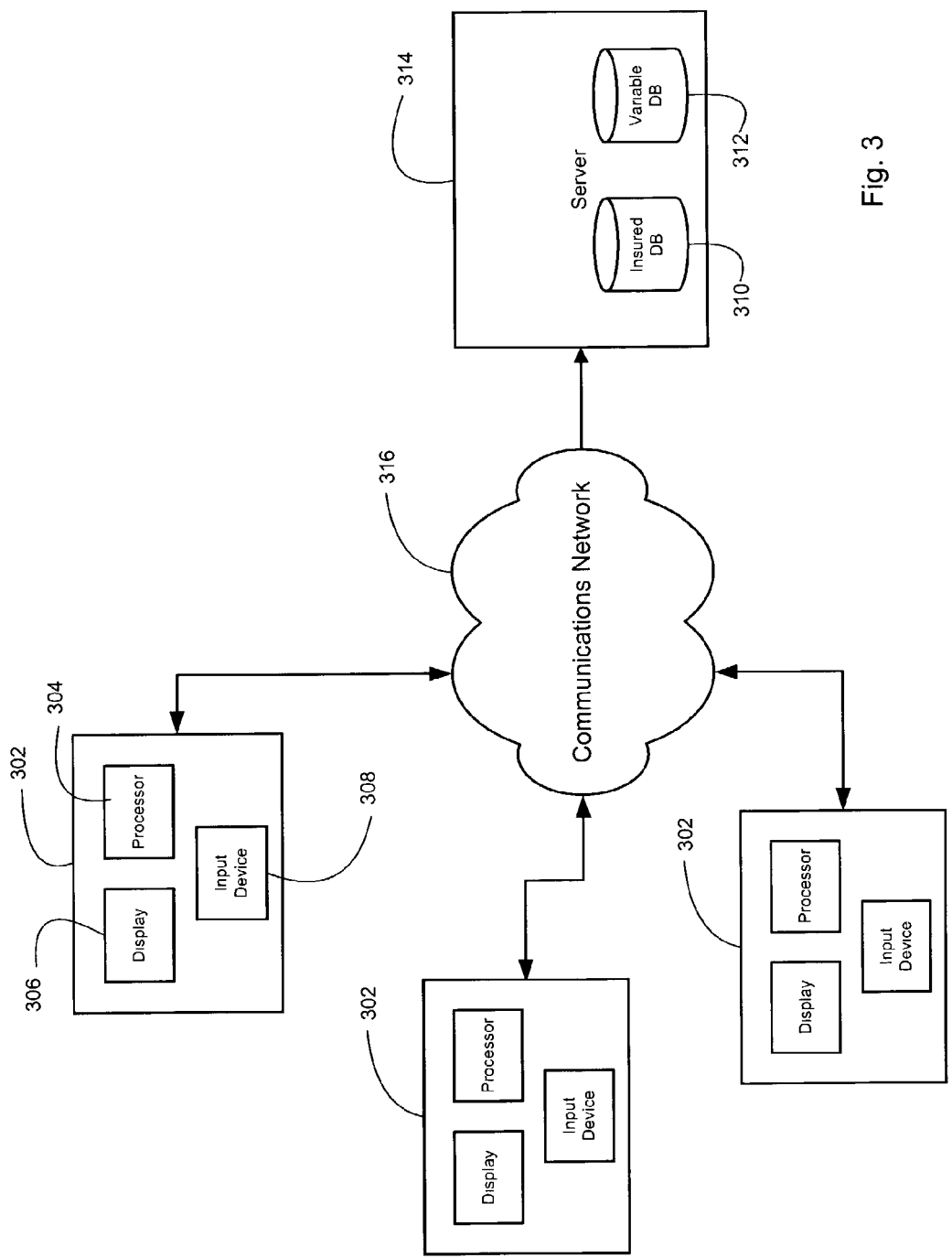
FIG. 3 is a diagram of a system useful in providing an insurance policy with inflation protection according to a preferred embodiment of this invention.

Referring to FIG. 3, a system useful in providing an insurance policy with inflation protection includes an agent interface 302 having a processor 304 and associated computer memory, a display device 306, and an input device 308. The agent interface 302 is at least one of a programmable calculator, or a personal computer or special purpose computer having appropriate software or otherwise designed to compute or assist in computing first insurance premiums, subsequent insurance premiums, etc., according to the methods described herein. The software, in one embodiment, is installed locally at the agent interface #102, thereby enabling a user, such as insurance agent, to input information, such as information useful in providing an LTC policy, and to compute or assist in computing a first insurance premium for an insurance policy having an inflation protection option as described above. The software is proprietary software designed to provide the methods described herein or, alternatively, standard software, such as a spreadsheet or a database program, adopted to perform the same.

In an alternative embodiment, the agent interface 302 is communicatively connected to at least one server 314 over a communications network 316, such as a local area network (LAN), a wide area network (WAN), the Internet, the World Wide Web (WWW), a wireless network, or a combination thereof. The server 314 includes at least one database, such as an insured database 310, and/or a variables database 312. The insured database 310 includes policy information for insured individuals, such as personal data, coverage limitations, relevant dates, inflation protection option, etc. The variables database 312 includes data necessary for computing or otherwise determining the first insurance premium, such as information related to policy expenses, claims incurred, percent of claims equal to expenses, rates of increase, expected contract year exposed, discount factors, margin percent, percent of premium equal to expenses, etc.

In one embodiment, the agent interface 302 accesses the relevant database or databases for the necessary information for computing or otherwise determining the first insurance premium for a policy with an inflation protection and may update the relevant databases accordingly. Alternatively, the agent interface 302 may transmit data necessary to compute a first premium to the server 314. The server 314 equipped with appropriate software computes the first insurance premium and communicates the computed premium to the agent interface 302, causing the agent interface 302 to display at least the computed first insurance premium. Similarly, the agent interface 302 accesses the insured database to compute a second insurance premium and to generate offers to purchase additional coverage at the computed premium.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computer implemented method of providing a long term care insurance policy having a first maximum coverage amount for daily benefits or aggregate claims, the method comprising:
obtaining an individual's age;
selecting a rate of increase;
computing with a computing device a first insurance premium for a long term care insurance policy for the individual based at least partially on the individual's age, the selected rate of increase, and an available option, offered on specified occasions after issuance through expiration of the long term care insurance policy, for the individual to purchase an additional maximum coverage amount proportional to the selected rate of increase, by paying a subsequent premium computed based at least partially on the individual's age at a date other than the date the available option is exercised, wherein the first insurance premium is computed using the following formula:

$$P = \sum_{t=1}^{t=\omega-x} [P_t + (N_t)(1 + C_t)(1 + R)^{(t-1)}](L_t)(V_t)$$

-continued $$\sum_{t=1}^{t=\omega-x}(1-M-E_t)(1+R)^{(t-1)}(L_t)(V_t)$$

where
P=the first insurance premium, annually
t=the year of duration of the policy
ω=contract terminal age
x=the individual's age at the date the policy issues
$P_t$=policy expenses for year t
$N_t$=claims incurred for year t
$C_t$=percent of claims expenses for year t
R=assumed average rate of increase
$L_t$=expected contract year exposed for year t
$V_t$=discount factor for duration of policy from beginning of year t back to issue date
M=margin percent
$E_t$=percent of premium expenses for year t; and
offering the long term care insurance policy including at least the first insurance premium.

2. A computer implemented method for providing a long term care insurance policy, the method comprising:
obtaining at least one item of information useful in providing an long term care insurance policy to an individual;
computing with a computing device a first insurance premium based at least partially on the at least one information item, a first coverage amount, and an option available on specified occasions after issuance through expiration of the long term care insurance policy for the individual to purchase an additional coverage amount at a subsequent premium computed based at least partially on the individual's age at a date other than a first date on which the available option is exercised;
wherein obtaining at least one item of information useful in providing an insurance policy to an individual comprises obtaining at least one of: a personal attribute, a policy limitation and a rate of increase;
wherein the first insurance premium is computed using the following formula:

$$P = \frac{\sum_{t=1}^{t=\omega-x}[P_t+(N_t)(1+C_t)(1+R)^{(t-1)}](L_t)(V_t)}{\sum_{t=1}^{t=\omega-x}(1-M-E_t)(1+R)^{(t-1)}(L_t)(V_t)}$$

where
P=the first insurance premium, annually
t=the year of duration of the policy
ω=contract terminal age
x=the individual's age at the date the policy issues
$P_t$=policy expenses for year t
$N_t$=claims incurred for year t
$C_t$=percent of claims expenses for year t
R=assumed average rate of increase
$L_t$=expected contract year exposed for year t
$V_t$=discount factor for duration of policy from beginning of year t back to issue date
M=margin percent
$E_t$=percent of premium expenses for year t; and
offering the long term care insurance policy including at least the first insurance premium.

3. The method of claim 2, comprising computing the first insurance premium based at least partially on the obtained personal attribute, the personal attribute comprising at least one of:
an age;
a gender; and
a risk based classification.

4. The method of claim 2, comprising computing the first insurance premium based at least partially on the obtained policy limitation, the policy limitation comprising at least one of:
a maximum daily benefit;
a maximum aggregate claims payable;
a deductible;
a benefit period; and
an elimination period.

5. The method of claim 2, comprising offering the long term care insurance policy at the computed first insurance premium.

6. The method of claim 5, comprising issuing the long term care insurance policy covering the individual and offering the option to purchase the additional coverage.

7. The method of claim 2, comprising computing the first insurance premium at least partially based on the available option that allows the individual to purchase an additional coverage amount, which option is offered at predetermined intervals.

8. The method of claim 7, wherein the option to purchase an additional coverage amount offered at predetermined intervals comprises being offered annually.

9. The method of claim 2, comprising computing the first insurance premium based at least partially on the individual being offered to purchase an additional coverage amount comprising at least one of:
increased maximum daily benefits; and
increased maximum aggregate claims.

10. The method of claim 2, comprising computing the first insurance premium at least partially based on a lack of restrictions on the available option that while the policy is in effect would affect the individuals ability to purchase an additional coverage amount.

11. The method of claim 2, wherein the first insurance premium is computed as a fixed premium.

12. The method of claim 2, comprising:
selecting a rate of increase; and
computing the first insurance premium based at least partially on an available option for the individual to purchase additional coverage proportional to the selected rate of increase.

13. The method of claim 12, wherein the obtained rate of increase is selected from a group of rates of increase comprising:
a rate that is equal to the consumer price index; and
a rate that is greater than the consumer price index by one or more selectable or given percentages.

14. The method of claim 2, comprising computing the first insurance premium computed based at least partially on the available option for the individual to purchase an additional coverage amount at a subsequent premium computed based at least partially on the individual's age at a date the long term care insurance policy issues.

15. The method of claim 1, comprising computing the first insurance premium based at least partially on a personal attribute, the personal attribute comprising at least one of:
an age;
a gender; and
a risk based classification.

16. The method of claim 1, comprising computing the first insurance premium based at least partially on a policy limitation, the policy limitation comprising at least one of:
- a maximum daily benefit;
- a maximum aggregate claims payable;
- a deductible;
- a benefit period; and
- an elimination period.

17. The method of claim 1, comprising offering the long term care insurance policy at the computed first insurance premium.

18. The method of claim 17, comprising issuing the long term care insurance policy covering the individual and offering the option to purchase the additional coverage.

19. The method of claim 1, comprising computing the first insurance premium at least partially based on the available option that allows the individual to purchase an additional coverage amount, which option is offered at predetermined intervals.

20. The method of claim 1, comprising computing the first insurance premium at least partially based on a lack of restrictions on the available option that while the policy is in effect would affect the individuals ability to purchase an additional coverage amount.

21. The method of claim 1, wherein the first insurance premium is computed as a fixed premium.

22. The method of claim 1, wherein the selected rate of increase is selected from a group of rates of increase comprising:
- a rate that is equal to the consumer price index; and
- a rate that is greater than the consumer price index by one or more selectable or given percentages.

23. A computer implemented method of providing a long term care insurance policy having a first maximum coverage amount for daily benefits or aggregate claims, the method comprising:
- obtaining an individual's age;
- selecting a rate of increase;
- computing with a computing device a first insurance premium for a long term care insurance policy for the individual based at least partially on the individual's age, the selected rate of increase, and an available option, offered after issuance of the long term care insurance policy, for the individual to purchase an additional maximum coverage amount proportional to the selected rate of increase, by paying a subsequent premium computed based at least partially on the individual's age at a date the policy issues and not on the individual's age at a date the available option is exercised, wherein the first insurance premium is computed using the following formula:

$$P = \frac{\sum_{t=1}^{t=\omega-x} [P_t + (N_t)(1 + C_t)(1 + R)^{(t-1)}](L_t)(V_t)}{\sum_{t=1}^{t=\omega-x} (1 - M - E_t)(1 + R)^{(t-1)}(L_t)(V_t)}$$

where
- P=the first insurance premium, annually
- t=the year of duration of the policy
- ω=contract terminal age
- x=the individual's age at the date the policy issues
- $P_t$=policy expenses for year t
- $N_t$=claims incurred for year t
- $C_t$=percent of claims expenses for year t
- R=assumed average rate of increase
- $L_t$=expected contract year exposed for year t
- $V_t$=discount factor for duration of policy from beginning of year t back to issue date
- M=margin percent
- $E_t$=percent of premium expenses for year t; and offering the long term care insurance policy including at least the first insurance premium.

24. A computer implemented method for providing a long term care insurance policy, the method comprising:
- obtaining at least one item of information useful in providing a long term care insurance policy to an individual, which item of information comprises at least one of: a personal attribute, a policy limitation, and a rate of increase;
- computing with a computing device a first insurance premium based at least partially on the at least one information item, a first coverage amount, and based on an option available for a first date for the individual to purchase an additional coverage amount at a subsequent premium computed based at least partially on the individual's age at a date other than a first date on which the available option is exercised, wherein the first insurance premium is computed using the following formula:

$$P = \frac{\sum_{t=1}^{t=\omega-x} [P_t + (N_t)(1 + C_t)(1 + R)^{(t-1)}](L_t)(V_t)}{\sum_{t=1}^{t=\omega-x} (1 - M - E_t)(1 + R)^{(t-1)}(L_t)(V_t)}$$

where
- P=the first insurance premium, annually
- t=the year of duration of the policy
- ω=contract terminal age
- x=the individual's age at the date the policy issues
- $P_t$=policy expenses for year t
- $N_t$=claims incurred for year t
- $C_t$=percent of claims expenses for year t
- R=assumed average rate of increase
- $L_t$=expected contract year exposed for year t
- $V_t$=discount factor for duration of policy from beginning of year t back to issue date
- M=margin percent
- $E_t$=percent of premium expenses for year t; and offering the long term care insurance policy including at least the first insurance premium.

* * * * *